US006992712B2

United States Patent
Yoshida (10) Patent No.: US 6,992,712 B2
(45) Date of Patent: Jan. 31, 2006

(54) IMAGING APPARATUS (75) Inventor: Hideaki Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 809 days.

(21) Appl. No.: 09/772,662

(22) Filed: Jan. 30, 2001

(65) Prior Publication Data

US 2002/0012053 A1 Jan. 31, 2002

(30) Foreign Application Priority Data

Feb. 4, 2000 (JP) ........................................ 2000-028319

(51) Int. Cl.
*H04N 9/64* (2006.01)

(52) U.S. Cl. ........................................ 348/243; 348/362
(58) Field of Classification Search ................ 348/241, 348/243, 244, 246, 362–368, 221.1, 222.1, 348/229.1, 255
See application file for complete search history.

(56) References Cited

U.S. PATENT DOCUMENTS

| 5,245,439 | A | * | 9/1993 | Kim | 386/26 |
| 5,272,536 | A | * | 12/1993 | Sudo et al. | 348/243 |
| 5,796,430 | A | * | 8/1998 | Katoh et al. | 348/246 |
| 6,028,628 | A | * | 2/2000 | Van Der Valk | 348/246 |
| 6,650,364 | B1 | * | 11/2003 | Itani et al. | 348/229.1 |
| 6,710,808 | B1 | * | 3/2004 | Yamagishi | 348/362 |
| 2002/0001416 | A1 | * | 1/2002 | Zhou et al. | 382/268 |

FOREIGN PATENT DOCUMENTS

| JP | 60-53383 | 3/1985 |
| JP | 10-243291 A | 9/1998 |
| JP | 11-18002 A | 1/1999 |
| JP | 11-41530 A | 2/1999 |
| JP | 11-215439 A | 8/1999 |

\* cited by examiner

*Primary Examiner*—James J. Groody
*Assistant Examiner*—Yogesh Aggarwal
(74) *Attorney, Agent, or Firm*—Frishauf, Holtz, Goodman & Chick, P.C.

(57) ABSTRACT

In an imaging apparatus for detecting a dark output level superposed on an imaging signal which is an output signal of an imaging device and correcting the imaging signal based on the detected dark output level, occurrence of a false signal caused by the dark output correction process is prevented and a substantial lowering in the effective imaging range is prevented by eliminating a dark output component from the imaging signal and setting a clip level and gain for a subject signal component according to the detected dark output level.

16 Claims, 7 Drawing Sheets

FIG. 8B ns of a large
number of pixels are increased over the entire portion of the
image plane, particularly, at the high temperature or at the
time of long-time exposure, the number of substantially
effective pixels is extremely reduced, and as a result, the
image quality will be extremely deteriorated.

IMAGING APPARATUS

CROSS-REFERENCE TO RELATED APPLICATIONS

This application is based upon and claims the benefit of priority from the prior Japanese Patent Application No. 2000-28319, filed Feb. 4, 2000, the entire contents of which are incorporated herein by reference.

BACKGROUND OF THE INVENTION

This invention relates to an imaging apparatus having a function of correcting a dark output of an imaging device.

Recently, in order to image and record mainly still pictures, electronic still cameras are developed. In video cameras for recording moving pictures, a still picture imaging/recording function is added. When photographing still pictures by use of the above cameras, the so-called long-time exposure technique in which the exposure time is elongated by making long the charge storage time of the imaging device is used. In the long-time exposure technique, the photographing can be attained without using an auxiliary light source such as a strobe light in a low illumination environment.

In the imaging device, since a dark output due to a so-called dark current exists, there occurs a problem that the dark output is superposed on an image signal to deteriorate the image quality. As a method for compensating for deterioration of the image quality due to the dark output, a method for using output information of the pixel and subtracting the dark output level from the output level of the pixel signal to derive only the signal component is disclosed in Jpn. Pat. Appln. KOKAI Publication No. 60-53383, for example, and is known in the art. In this specification, a process for eliminating the dark output component from the deteriorated signal output of the pixel is referred to as a dark output correction process. The correction process is excellent in principle in that original pixel information can be derived without causing deterioration in the resolution.

However, if the dark output correction process is simply effected by use of the conventional technique, a false signal is created by the correction process and deterioration of the image quality occurs when the dark output level is high since the output range of the imaging device used in the present electronic camera is limited. This is explained by taking a concrete case as an example. It is assumed that a dark output of high level (which is set at 50% of the saturation level of the imaging device) is generated from a pixel concerned. In this case, it is possible to eliminate the dark output by subtracting the dark output component by effecting the dark output correction process, but the output signal of the pixel concerned is 50% of an original subject luminance level at maximum. That is, since the saturation level of the pixel concerned is lowered, a so-called black scar occurs when the subject to be actually photographed is bright.

More specifically, since the dark output correction process has the above problem, deterioration of the image quality due to the dark output is conventionally compensated for mainly by the pixel defect compensating technique. The pixel defect compensating technique is to determine a deteriorated pixel whose dark output level is higher than a preset level as a "defective pixel", make information of the pixel invalid and use nearby pixel information instead of the deteriorated pixel information. The pixel defect compensating technique is extremely effective when only a small number of "defective pixels" independently exist.

However, in this type of pixel defect compensating technique, since the pixel information of the deteriorated pixel is made invalid and discarded, the resolution is locally lowered in principle. When dark output levels of a large number of pixels are increased over the entire portion of the image plane, particularly, at the high temperature or at the time of long-time exposure, the number of substantially effective pixels is extremely reduced, and as a result, the image quality will be extremely deteriorated.

BRIEF SUMMARY OF THE INVENTION

This invention has been made by taking the above condition into consideration and an object of this invention is to provide an imaging apparatus for obtaining high-quality images which is used for improving the conventional dark output correction technique and solving the above problem caused by output saturation of an imaging device or system when the dark output correction process is performed and which can be applied even in a case where the dark output levels of a large number of pixels in the entire portion of the image plane are enhanced, particularly, at the high temperature or at the time of long-time exposure.

In order to attain the above object, this invention adopts the following construction.

That is, this invention is an imaging apparatus comprising an imaging device having a plurality of pixels arranged in a two-dimensional fashion; dark output level detecting means for detecting a dark output level for each pixel superposed on an imaging signal which is an output signal of the imaging device; and dark output correction means for correcting the imaging signal based on the dark output level detected by the dark output level detecting means and setting a clip level for a subject component of the imaging signal according to the dark output level detected by the dark output level detecting means.

Further, this invention is an imaging apparatus comprising an imaging device having a plurality of pixels arranged in a two-dimensional fashion; dark output level detecting means for detecting a dark output level for each pixel superposed on an imaging signal which is an output signal of the imaging device; and dark output correction means for correcting the imaging signal based on the dark output level detected by the dark output level detecting means and setting an effective gain for a subject component of the imaging signal according to the dark output level detected by the dark output level detecting means.

Further, this invention is an imaging apparatus comprising an imaging device having a plurality of pixels arranged in a two-dimensional fashion; dark output level detecting means for detecting a dark output level for each pixel superposed on an imaging signal which is an output signal of the imaging device; and dark output correction means for correcting the imaging signal based on the dark output level detected by the dark output level detecting means, setting a clip level for the corrected imaging signal according to the dark output level detected by the dark output level detecting means and setting an effective gain for the corrected imaging signal according to the dark output level detected by the dark output level detecting means.

Further, this invention is an imaging apparatus comprising an imaging device having a plurality of pixels arranged in a two-dimensional fashion; dark output level detecting means for detecting a dark output level for each pixel superposed on an imaging signal which is an output signal of the imaging device; dark output correction means for correcting the imaging signal by removing a dark output component from the imaging signal for each pixel based on the dark output level detected by the dark output level detecting means, setting a clip level for the corrected imaging signal according to the maximum value of the dark output level detected by the dark output level detecting means and setting an effective gain for the corrected imaging signal according to the set clip level; and exposure correction means for correcting the exposure of the imaging device according to the gain setting in the dark output correction means.

Further, this invention is an imaging method comprising the steps of imaging a subject by use of an imaging device which has a plurality of pixels arranged in a two-dimensional fashion; detecting a dark output level for each pixel superposed on an imaging signal obtained by imaging the subject; correcting the imaging signal based on the detected dark output level; setting a clip level for the corrected imaging signal according to the detected dark output level; and setting an effective gain for the corrected imaging signal according to the set clip level.

According to this invention with the above construction, an excellent effect that a false signal such as a black scar will not occur while the dark output correction is being made can be attained by setting the clip level for the subject signal component of a video signal according to the dark output level and setting the effective gain if required. Therefore, an imaging apparatus for obtaining high-quality images can be realized which can solve the problem caused by output saturation of the imaging device or system when the dark output correction process is effected and which can be applied even in a case where the dark output levels of a large number of pixels in the entire portion of the image plane are enhanced, particularly, at the high temperature or at the time of long-time exposure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principle of the invention.

DETAILED DESCRIPTION OF THE INVENTION

There will now be described an embodiment of this invention in detail with reference to the accompanying drawings.

(Embodiment)

Figure 1:
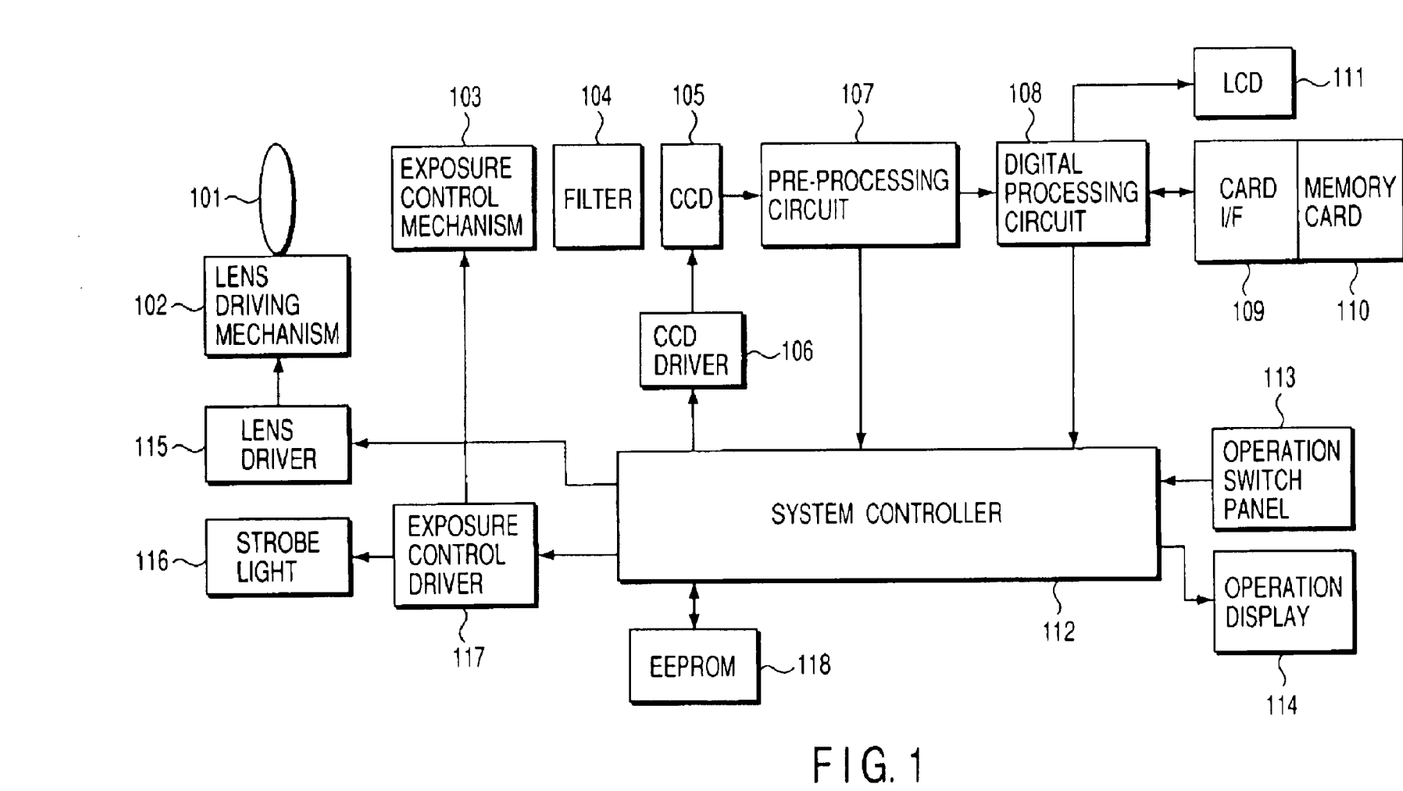
FIG. 1 is a block diagram showing the whole construction of an electronic still camera according to one embodiment of this invention.

FIG. 1 is a block diagram showing the basic construction of an electronic still camera according to one embodiment of this invention. In this embodiment, a still camera used for imaging still pictures is explained, but a camera having a moving picture imaging function in addition to a still image picture imaging function can be used.

A reference numeral 101 in FIG. 1 denotes a photographing lens system having a plurality of lenses for guiding light rays from a subject into the camera. The lens system 101 is driven by a lens driving mechanism 102 so as to be focused on a subject. An exposure control mechanism 103 for controlling exposure includes a diaphragm and a diaphragm driving mechanism for driving the diaphragm and is provided to control the diaphragm so as to limit an incident light amount of the light ray which has passed through the lens system 101. Further, in the exposure control mechanism 103, a mechanical shutter is provided. The light ray having passed through the exposure control mechanism 103 is guided to a CCD color imaging device 105 via a low-pass and infrared cut-off filter 104. Thus, an image corresponding to the subject is formed on the CCD color imaging device 105.

As the mechanical shutter provided in the exposure control mechanism 103, a guillotine shutter and focal-plane shutter used in the conventional analog camera are provided as the representative of an optical shutter. As the optical shutter other than the mechanical shutter, for example, a liquid crystal shutter or PLZ shutter is given. On the incident plane of the CCD color imaging device 105, color filters of R, G, B (red, green and blue) are provided.

The CCD color imaging device 105 is driven by a CCD driver 106 for generating a driving signal. Pixel signals of respective colors, for example, R, G, B corresponding to the color filters are generated from the CCD color imaging device 105 and input to a pre-processing circuit 107 having an A/D converter or the like and a pixel signal converted into a digital form is output from the pre-processing circuit 107. The pixel signal is input to a digital processing circuit 108 and subjected to the color signal creation process, matrix conversion process and other various digital processes in the digital processing circuit 108 to create color image data. Then, the color image data is stored into a memory card 110 such as a CF (Compact Flash Memory Card) or the like via a card interface 109 and displayed on an LCD 111 as a color image.

Further, the electronic still camera shown in FIG. 1 has a system controller (CPU) 112 for generally controlling the respective portions. When an operation switch panel 113 having various switches including a release button is operated, the system controller 112 sets an operation mode according to the operation of the operation switch panel 113 and causes an operation display device 114 to display the operation state, mode state and the like. Further, the system controller 112 gives an instruction of lens driving, for example, focusing instruction to a lens driver 115 in response to the operation of the operation switch panel 113, for example, release button. The lens driving mechanism 102 is controlled according to the lens driving signal from the lens driver 115 to drive the lens of the lens system 101 so as to attain the zooming operation or focusing operation. Further, the camera has a strobe light 116 as light emitting means for applying light rays to the subject. The strobe light 116 is controlled by an exposure control driver 117, the light emission amount thereof is determined by the exposure control driver 117 and the light ray of an adequate light amount is applied to the subject. To the system controller 112, a nonvolatile memory (EEPROM) 118 for storing various setting information items and the like is connected. The system controller 112 derives control signals for controlling various portions based on various parameters stored in the nonvolatile memory 118 and supplies the control signals to the respective portions.

In the electronic still camera shown in FIG. 1, the system controller 112 generally performs the whole control operation as described above. That is, it performs the exposure (charge storage) operation and signal reading operation by controlling the shutter contained in the exposure control mechanism 103 and the driving operation of the CCD imaging device 105 by the CCD driver 106. Then, it causes the digital processing circuit 108 to fetch the readout signal via the pre-processing circuit 107 and effect various signal processing operations, and after this, it records the signal into the memory card 110 via the card interface 109. In the above various signal processing operations, a dark output correction process which is a main portion of this invention as will be described later is contained. Then, it is assumed that the digital process of a signal level in this camera is performed based on 8 bits (0 to 255). Further, the explanation is made by assuming a normal temperature except a case which will be specifically described later.

Figure 2:
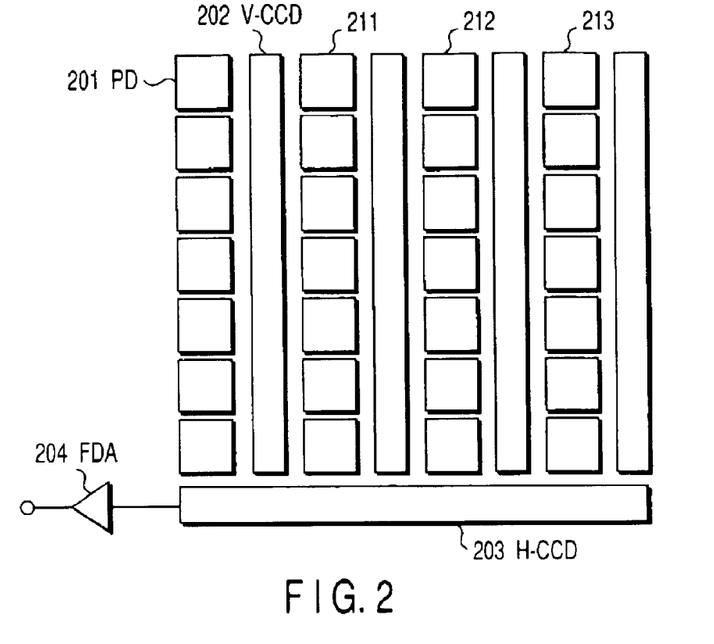
FIG. 2 is a plan view showing the device structure of a CCD imaging device used in the electronic still camera of FIG. 1.

FIG. 2 is a plan view showing the device structure of the CCD color imaging device 105. Photodiodes 201 are arranged in a matrix form as light receiving elements. A plurality of vertical CCDs 202 are arranged in a column direction between the photodiodes 201 and a single horizontal CCD 203 is arranged in a lateral direction on one-end side of the vertical CCDs 202. Signal charges stored in the photodiodes 201 are read out to the vertical CCDs 202 in response to a charge transfer pulse TG and transferred in the vertical CCDs 202 in a downward direction on the drawing. The signal charges transferred in the vertical CCDs 202 are transferred into the horizontal CCD 203, then transferred in the horizontal CCD 203 in a left direction on the drawing and finally output via an FDA (floating diffusion amplifier) 204 which is a readout amplifier.

Figure 3:
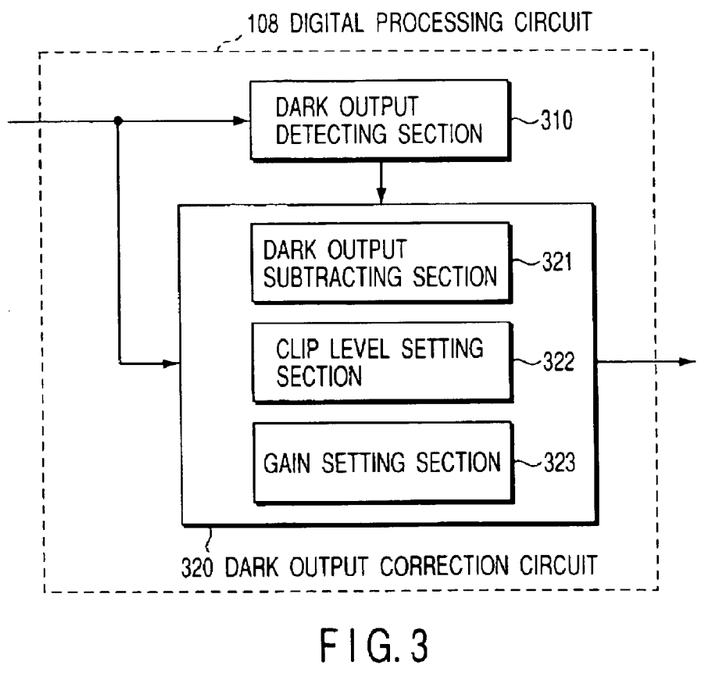
FIG. 3 is a block diagram showing the functional construction of a digital processing circuit used in the electronic still camera of FIG. 1.

FIG. 3 is a block diagram functionally showing the construction of the dark output correcting section of the digital processing circuit 108. A dark current is detected by a dark output detection section 310 based on a signal obtained by the exposing operation for a preset period of time while the shutter is kept closed. On the other hand, an imaging signal obtained by the normal exposing operation is inputted to a dark output correction circuit 320 and a dark current component is subtracted from the imaging signal in a dark output subtracting section 321. Up to the above process, the operation is the same as the conventional dark output correcting operation. Further, in this embodiment, a clip level setting section 322 and gain setting section 323 are provided. In the clip level setting section 322, a clip level for a signal obtained by the dark output subtracting section 321 is set based on the dark current component obtained by the dark output detecting section 310. In the gain setting section 323, a gain for the signal obtained by the dark output subtracting section 321 is adjusted based on the dark current component obtained by the dark output detecting section 310.

Figure 4:
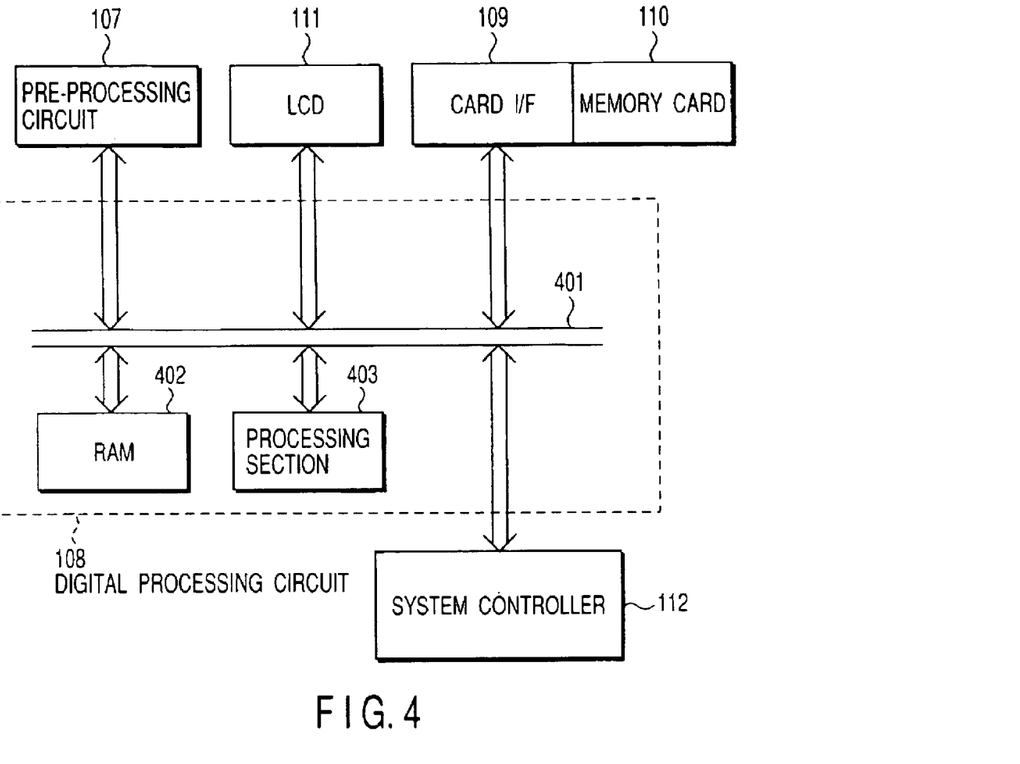
FIG. 4 is a block diagram showing the concrete construction of the digital processing circuit used in the electronic still camera of FIG. 1.

FIG. 4 is a block diagram showing the concrete construction of the digital processing circuit 108. A RAM 402 and processing section 403 are connected to a bus line 401. A dark output is detected by storing a signal obtained by the imaging operation with the shutter kept closed into the RAM 402. Further, an imaging signal obtained by the normal exposing operation is also stored into the RAM 402. Then, an imaging signal obtained by compensating for the dark current can be derived by subtracting the dark output component from the imaging signal obtained by the normal exposing operation and stored in the RAM 402 by use of the processing section 403. Further, a clip level is set by the system controller 112 based on the maximum value of the dark output stored in the RAM 402. Further, a gain-up amount is set so as to make the set clip level equal to the saturation level.

Next, the dark output correcting operation by using the digital camera of this embodiment is explained.

First, prior to the actual or formal photographing operation, a dark output level is detected. More specifically, when a photographing trigger instruction is received, a test imaging operation is effected while the light receiving surface of the imaging device 105 is shielded by use of the shutter device contained in the exposure control mechanism 103. That is, a test imaging signal (dark output signal) is read by effecting the charge storage operation for an expected exposure time Ttotal for the actual imaging operation in the dark environment by use of the CCD driver 106 and stored into the digital processing circuit 108.

In the case of this embodiment, since the exposure time of the test imaging operation and that of the actual imaging operation are set equal to each other, the coefficient (multiplier) used for deriving a dark output level at the time of actual imaging operation based on the test imaging signal obtained at this time is "1". That is, the test imaging signal level can be used as it is as the dark output level (dark output-eliminated reference signal).

Next, the dark output correcting operation is explained, but the contents of the process can be conceptually divided in some cases and explained. The first process is the same as the conventional process which is known in the art. That is, a signal obtained by subtracting the dark output-eliminated reference signal from each data of the pixel signal read out from the effective pixel portion is used as an output after correction. Of course, the subtracting operation is effected between data items having the same address.

Figure 5A:
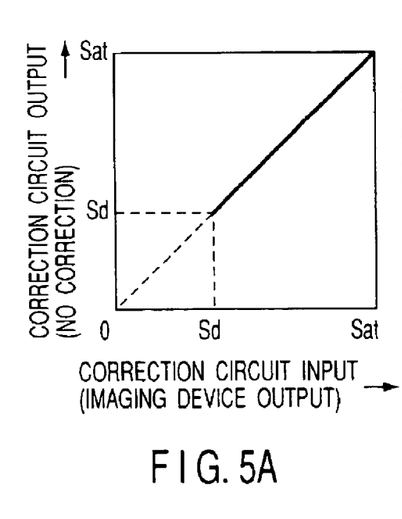
FIGS. 5A and 5B are diagrams respectively showing an input-output characteristic at the time of no-correction and an input-output characteristic of a dark output correction circuit.
Figure 5B:
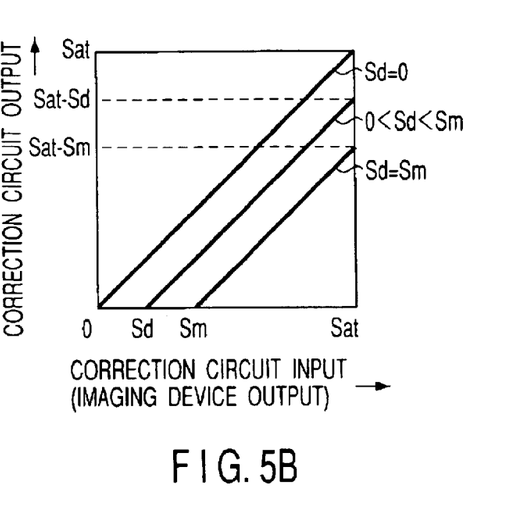

The first process is explained in more detail with reference to FIGS. 5A, 5B. In FIGS. 5A, 5B, the abscissa indicates an AD value of the imaging device output, that is, an input value of the dark output correction circuit and the ordinate indicates an output value of the dark output correction circuit. The input value is saturated when it has reached the saturation level of the imaging device or the maximum level of the AD conversion, but whether it is saturated with the former value or latter value is not essential. Therefore, in this case, it is assumed that saturation of the output signal of the imaging device is caused by the maximum level of the AD conversion and it is expressed by a symbol Sat. In this case, the symbols Sat described on the ordinates are numerically the same, but they are the maximum values of the output digital values and conceptually correspond to the output saturation level (output possible maximum value) of the dark output correction means. In FIGS. 5A, 5B, a subscript (i,j) is omitted.

FIG. 5A shows a case wherein no correction is made for reference, and since a dark output Sd is superposed on the input signal, a signal level Sd(i,j) is obtained even if the luminance of the subject is "0". FIG. 5B shows an example of the conventional dark output correction circuit for subtracting the dark output Sd(i,j) and the output signal characteristic thereof is certainly reflects on the luminance of the subject from which the dark output is eliminated. However, since no signal exceeding the saturated level Sat exists, only the maximum level of (Sat−Sd(i,j)) can be obtained. This does not develop into a problem when the dark output level Sd(i,j) to be corrected is small, but it develops into a serious problem when Sd(i,j) is large.

The concept of the first process is expressed by use of an equation as follows. That is, if an input image signal (that is, a digital value of an output of the imaging device corresponding to the effective image area) of the dark output correction means is Sig(i,j) and first intermediate data (which is conceptional and whether or not it actually exists in the process is not important) obtained when the dark output component is subtracted is Sdif(i,j), then the following equation is obtained.

$$Sdif(i,j)=Sig(i,j)-Sd(i,j)$$

In this stage, the subject component of the imaging signal is extracted, but the signal is based on the characteristic corresponding to FIG. 5B and a pixel having a large dark output remains as a black scar.

In order to solve the above problem, the dark output correction process of this embodiment effects the following clip process as the second process. If second intermediate data (which is conceptional and whether or not it actually exists in the process is not important) is Sclp(i,j), the following equations can be obtained.

$$Sclp(i,j)=Sdif(i,j) (\text{when } Sdif(i,j) \leq Sat-Sm)$$

$$Sclp(i,j)=Sat-Sm (\text{when } Sdif(i,j) > Sat-Sm)$$

In this case, Sat indicates the maximum input level (saturation level of the imaging signal) to the correction means and Sm indicates the maximum value of one image plane of Sd(i,j) (Sm=Max[i,j]{Sd(i,j)}). That is, Sdif(i,j) is output as it is until the first intermediate data reaches (Sat−Sm) and a constant output level (clip level) is output when the first intermediate data exceeds (Sat−Sm). By the clip process, the maximum levels (saturation levels) of the whole pixels are set to the same level so that the black scar will not occur.

Figure 6A:
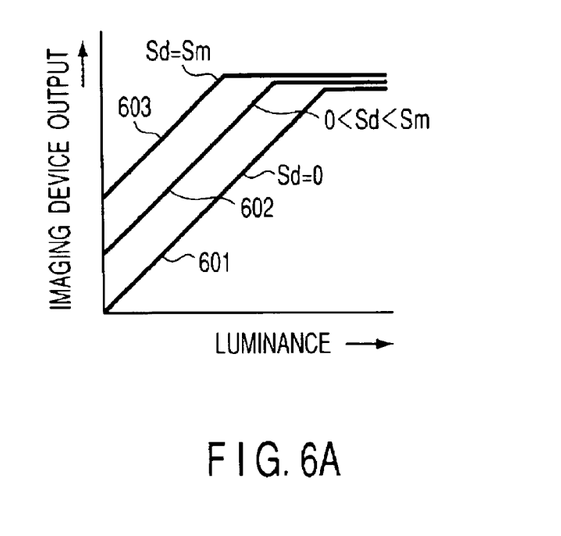
FIGS. 6A to 6D are diagrams showing the relation of the imaging device output and correction circuit output with respect to the luminance of a subject in this embodiment.

The above state is shown in FIGS. 6A to 6D and FIG. 7A. As shown in FIG. 2, amounts of dark currents are different for each pixel, and therefore, it is assumed that a pixel having no dark current is denoted by 211, a pixel having a small dark current is denoted by 212 and a pixel having the maximum dark current is denoted by 213. An output signal of the imaging device for the luminance of the subject is shown in FIG. 6A. In FIG. 6A, a signal of the pixel 211 having no dark current is indicated by 601, a signal of the pixel 212 having a small dark current is indicated by 602 and a signal of the pixel 213 having a large dark current is indicated by 603. An output is "0" in the signal 601 of the pixel 211 having no dark current when the luminance is "0" and certain outputs exist in the signals 602, 603 of the pixels 212, 213 having the dark currents even if the luminance is "0". However, the saturation levels of the signals 601, 602, 603 are the same.

Figure 6B:
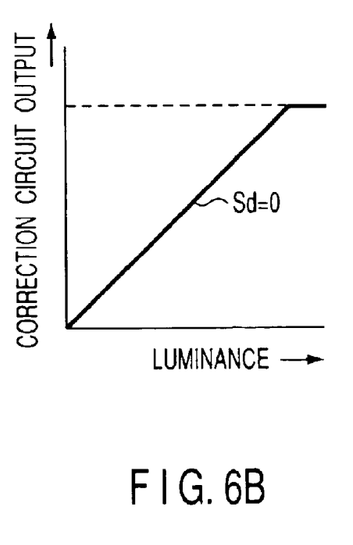
Figure 6C:
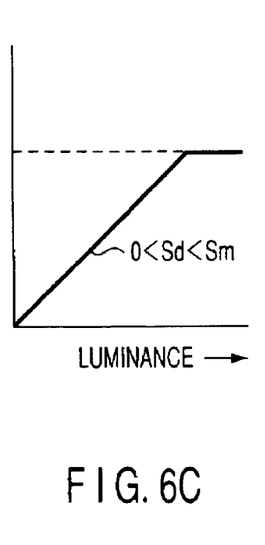
Figure 6D:
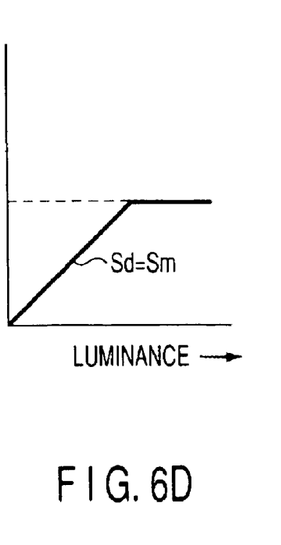
Figure 7A:
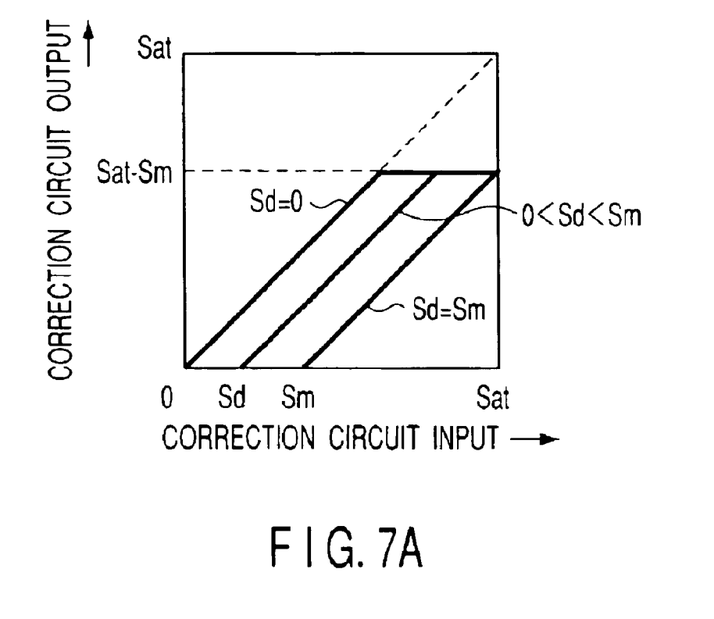
FIGS. 7A and 7B are diagrams showing examples of an input-output characteristic of the dark output correction circuit in this embodiment.

FIGS. 6B to 6D are diagrams obtained by re-drawing the state of FIG. 5B as the relation between the luminance of the subject and the output of the correction circuit, and a signal obtained by subtracting the dark current component from the signal 601 is shown in FIG. 6B, a signal obtained by subtracting the dark current component from the signal 602 is shown in FIG. 6C and a signal obtained by subtracting the dark current component from the signal 603 is shown in FIG. 6D. The clip level is determined based on the correction signal of the pixel having the largest dark current as shown in FIG. 6D. As a result, such a characteristic as shown in FIG. 7A is obtained. The definition of the abscissa, ordinate and symbols of FIG. 7A is the same as that of FIGS. 5A, 5B.

However, since the whole portion of the image plane becomes dark only if the above process is effected, a correction process for multiplying a constant (which is called a gain correction process) is finally effected. If an output obtained after the correction process is denoted by Sout(i,j), the following equation is obtained.

$$Sout(i,j)=Sclp(i,j) \times Sat/(Sat-Sm)$$

In this case, the symbols Sat in the numerator and denominator are numerically equal to each other in this example, but Sat in the numerator conceptually corresponds to the maximum output level (saturation level of the output signal) of the correction means and Sat in the denominator corresponds to the maximum input level (saturation level of the imaging signal).

Figure 7B:
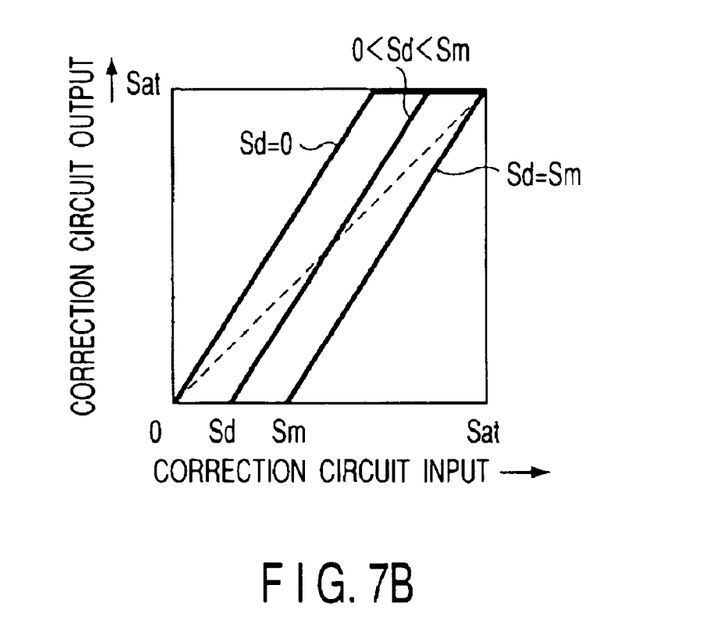

That is, the effective gain for the subject component is adjusted so as to precisely set an output corresponding to the clip level equal to Sat (saturation level of the output signal). If the above correspondence relation is set up, substantially the clip process can be effected simply by effecting the gain-up process without particularly effecting the above clip process. The general characteristic of the dark output process obtained at this time is shown in FIG. 7B. As is clearly understood from FIG. 7B, it is possible to obtain the characteristic equivalent to that obtained by effecting the effective gain-up process for the subject component after only the subject component is extracted from the input signal.

If the above dark output correction process is effected, the image plane becomes bright by the gain correction process, but the reproduction area cannot be improved by the above process when attention is paid to the luminance area of the subject. That is, the imaging range which is narrowed by the dark output is kept narrow and is not improved. The reason is that, although the gain is increased, the exposure is adequately adjusted for the imaging system before the gain is increased, and therefore, the overexposed state occurs. The camera of this embodiment further includes means for correcting the exposure and attaining the adequate exposure so as not to cause the overexposed state.

Specifically, the system controller 112 once performs the test imaging process for reducing the dark output according to the above explanation, then changes the exposure and effects the actual exposure process. That is, the gain item can be acquired as the result of the test imaging process. In this case, since the exposure amount required is (Sat−Sm)/Sat times the initial value, the diaphragm opening is decreased accordingly with respect to the initial value, for example. If the exposure is expressed by use of an F value, F' may be set equal to $F \times \sqrt{\{Sat/(Sat-Sm)\}}$.

Further, this can be coped with by reducing the exposure time, and in this case, since the dark output level is lowered in proportion to a reduction in the exposure time, the clip level can be slightly raised when the lowering in the dark output level is taken into consideration.

The video signal processing operation of the succeeding-stage circuits for recoding after the dark output correction process includes a color balance process, a conversion process for luminance-color difference signal by the matrix operation or the inverse conversion process thereof, a false color elimination or reduction process by band limitation or the like, various non-linear processes as is represented by the γ transform, various information compression processes and the like which are adequately used as required and are well known in the art.

Figure 8A:
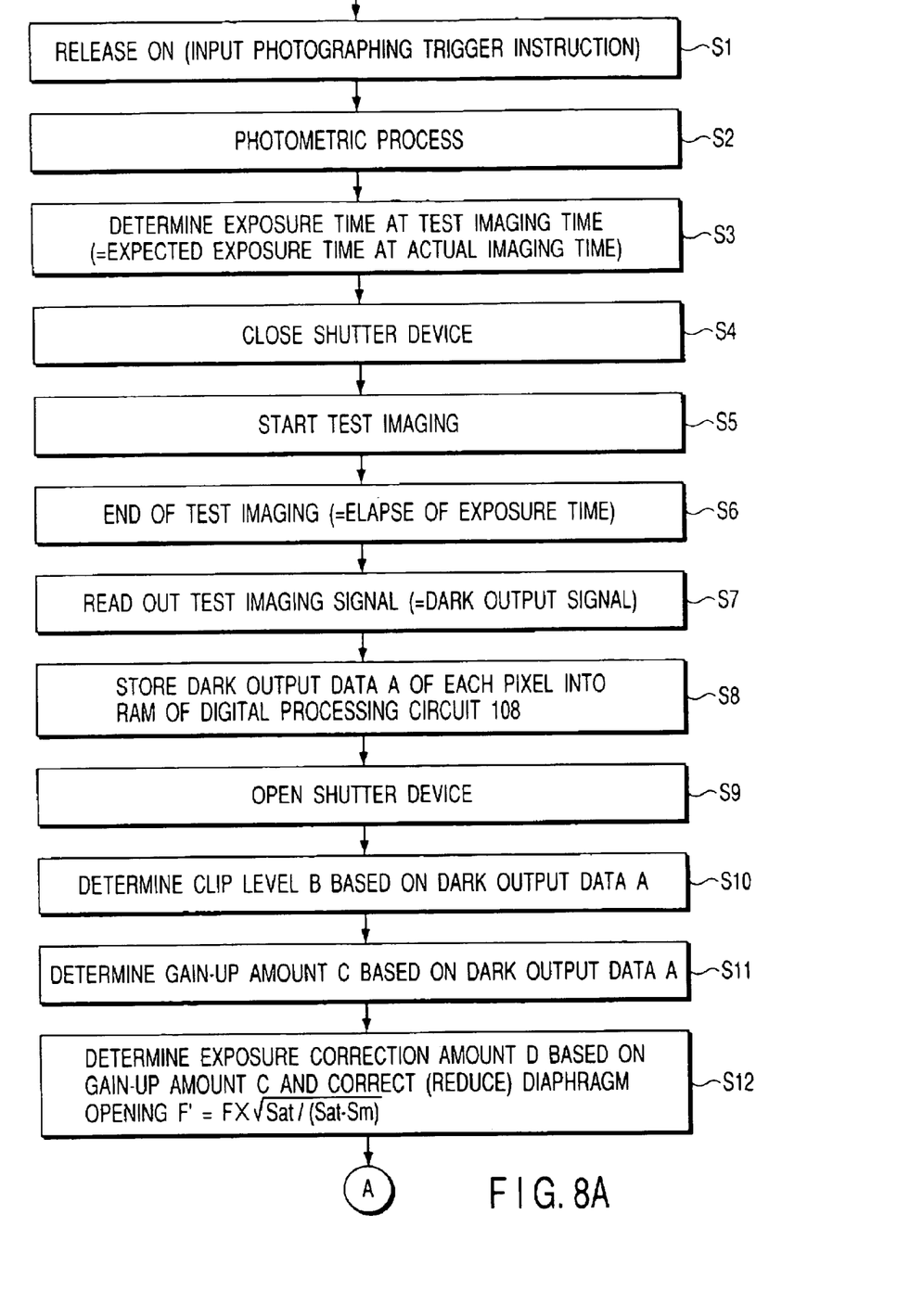
FIGS. 8A and 8B are flowcharts for illustrating an imaging operation in this embodiment.
Figure 8B:
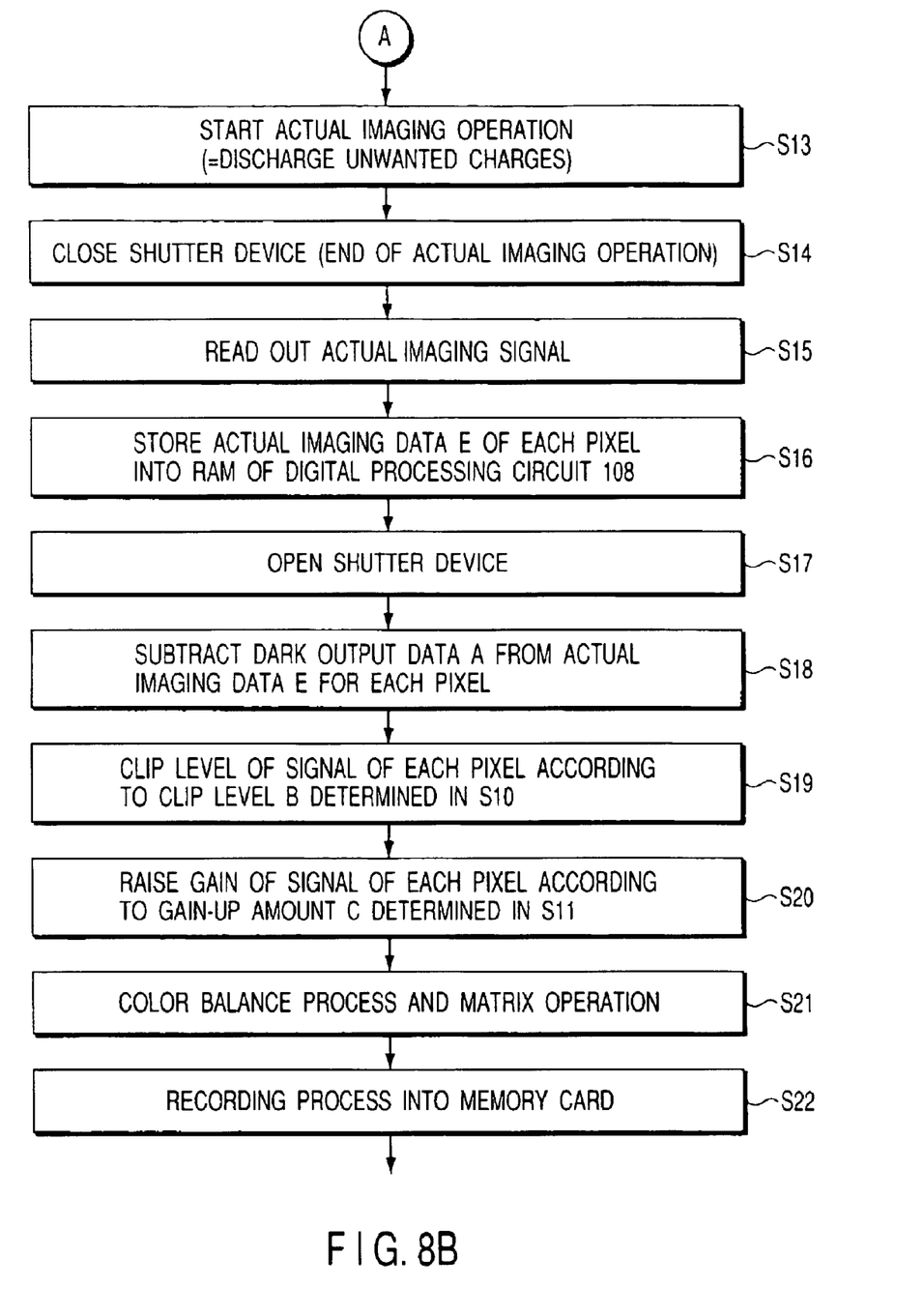

Next, the imaging operation of this embodiment is explained in detail with reference to FIGS. 8A and 8B.

First, an operation input by the operation switch panel 113 is waited, and if the release is ON in the step S1, a photographing trigger instruction is input. Then, the photo-metric process is started in the step S2 and the exposure time for the test imaging operation is determined in the step S3. For example, the exposure time is set equal to the expected exposure time (charge storage time) for the actual imaging operation. Next, the shutter is closed in the step S4 and the test imaging operation is started in the step S5. After the elapse of a preset exposure time, the test imaging operation is terminated in the step S6.

After this, a test imaging signal corresponding to a dark current signal is read out in the step S7 and dark output data A for each pixel is stored into the RAM 402 of the digital processing circuit 108 in the step S8. Then, the shutter device is opened in the step S9 and a clip level B is determined based on the dark output data A in the step S10. More specifically, the clip level is determined so as to be set equal to the saturation level of a correction signal obtained by eliminating the dark output component from the imaging signal of a pixel having the largest dark output data A. The clip level corresponds to the saturation level indicated by broken lines in FIG. 6D. Next, a gain-up amount C is determined based on the dark output data A in the step S11. Specifically, the gain-up amount is determined so that the saturation level of a correction signal obtained by eliminating the dark output component from the imaging signal of a pixel having the largest dark output data A can be set equal to the saturation level obtained before correction. Further, in the step S12, an exposure correction amount D is determined based on the gain-up amount C and the diaphragm driving operation is effected accordingly (F' as described before).

Then, in the step S13, the actual imaging operation is started after unwanted charges are discharged. After this, in the step S14, the shutter is closed after the exposure time of the actual imaging operation has passed (at this time, the correction based on the exposure correction amount D determined in the step S12 may be reflected not on the diaphragm opening but on the exposure time). Next, an actual imaging signal is read out in the step S15 and actual imaging data E for each pixel is stored into the RAM 402 of the digital processing circuit 108 in the step S16. Further, the shutter is opened in the step S17.

Then, in the step S18, the dark output data A is subtracted from the actual imaging data E for each pixel. In the step S19, the level of the signal of each pixel is clipped based on the clip level B determined in the step S10. Next, in the step S20, the gain of the signal of each pixel is increased according to the gain-up amount C determined in the step S1. Further, in the step S21, processes such as the color balance process and matrix operation are effected. Then, finally, in the step S22, the recording process into the memory card 110 is effected. After this, an operation input waiting state is set and the process returns to the step S1.

Thus, according to the electronic still camera of this embodiment, since the clip level for the subject component of the imaging signal is set according to the dark output level, a false signal such as a black scar can be prevented from occurring while the dark output is being corrected. In addition, occurrence of a problem that the image plane becomes dark due to the dark output correction process can be prevented by setting the effective gain for the subject component of the imaging signal according to the dark output level. Further, an excellent effect that a high-quality image with the imaging characteristic equivalent to that obtained when a normal subject which does not cause a dark output is imaged can be attained by correcting the exposure according to the effective gain.

Therefore, it is possible to realize an electronic still camera for attaining high-quality images which can solve the problem caused by saturation of the imaging device or system when the dark output correction is made and can be applied even in a case where the dark output levels of a large number of pixels in the entire portion of the image plane are enhanced, particularly, at the high temperature or at the time of long-time exposure.

(Modification)

This invention is not limited to the above embodiment. In the above embodiment, in order to clarify the explanation, the charge storage time and exposure time are regarded as being equal to each other. Strictly speaking, the above times are not always equal to each other, for example, in a case where the charge storage operation is started before starting the exposure process by use of the mechanical shutter or where a method for transferring charges to the transfer path a preset period of time after completion of the exposure process or starting the transfer process a preset period of time after transferring the stored charges to the transfer path, that is, a so-called delayed reading method is used. However, since the system controller 112 manages and controls the difference between the above times, the above embodiment can be applied by specifically taking the above difference into consideration as required.

Further, the quantization level of the AD converter used in the above embodiment is additionally explained. In practice, an error characteristic which the AD converter used as the hardware has is present and even if it is not present, a quantization error in approximately the minimum quantization level corresponds to 10% in principle. By taking this into consideration, it is of course preferable to use an AD converter having 10 bits or 12 bits (or more) which is larger than the number of quantization bits (8 bits in the embodiment) of the image processing system as the AD converter used for actual quantization in the above embodiment if circumstances permit.

Further, various modifications other than the above modification can be considered. First, in the above case, the exposure time Ttotal of the actual exposure is used as it is in the process for setting the exposure time of the test imaging operation, but it is possible to set the exposure time to Ttotal/2 or Ttotal/10, for example, and reduce the exposure time. In the case of the modification, the dark output level is derived by taking it into consideration that the dark charges approximately vary in proportion to the storage time. That is, in a case where the exposure time at the test imaging time is set to Ttotal/N, the coefficient (multiplier) used for deriving a dark output level at the actual imaging time based on the test imaging signal thus obtained is set to N and the defect detection process and dark current correction process are effected in the succeeding steps by using a dark output level derived by s=[test imaging signal level]×N.

It is of course possible to use a fixed value as the test imaging exposure time in at least a range in which Ttotal is smaller than a preset value by performing the similar operations. Further, in the direct photometric case (in which termination of the exposure is automatically controlled by use of an integrated value of the exposure amount at the actual exposure time), it is suitable to use predicted exposure time.

Thus, limitations on the exposure time for the test imaging operation become less and the release time lag can be made small, for example, and thus the usability can be enhanced by deriving the dark output level at the actual imaging time based on the output level of the imaging device obtained by the test imaging operation, the test imaging time of the test imaging operation and the charge storage time in the exposure control process at the actual imaging time.

It is preferable to set the timing of the test imaging operation at the timing immediately before the actual imaging operation, but this is not limitative. For example, the above timing can be set at desired timing to serve the purpose, for example, at the time when the power supply is turned ON, when the photographing mode is set in a camera which can be switched between the reproducing mode and photographing mode, when the first-stage operation is effected in a two-stage release switch camera (the second-stage operation is a photographing trigger), or when a test imaging switch which is separately provided is operated. Further, it is possible to set the test imaging timing at the time after the exposure for the actual imaging operation is effected. That is, since the imaging signal is stored in the digital form in the digital processing circuit 108, it is possible to effect the test imaging operation after the exposure if the signal processing for recording is temporarily stopped.

This modification has a significant effect that it can be easily applied to a desired exposure control process such as the direct photometric process or so-called bulb-shutter photographing operation or time-shutter photographing operation (in each of which the photographer manually controls termination of the exposure at desired timing) since there is no increase in the release time lag due to the test imaging operation and it is not necessary to previously set the exposure time.

Further, the variable gain for the subject component which is set according to the dark output correction may be set to a desired value different from that used in the above embodiment according to circumstances. Specifically, effective input and output ranges can be made equal to each other while "a spurious signal caused by saturation does not occur" by setting the effective gain for the subject component of the imaging signal to a value obtained by dividing the maximum output level of the dark output correction circuit (a value corresponding to the saturation level on the output side of the dark output correction means) by a difference between the saturation level of the imaging signal (a value corresponding to the saturation level on the input side of the dark output correction means) and the maximum value of the dark output level detected by the dark output level detecting section.

As described before, since the setting in the above embodiment is made so that an output corresponding to the clip level will be made just equal to Sat (saturation level of the output signal), the setting can be said as one of the best setting examples in a sense that the effective input and output ranges are made equal to each other. In this case, there may occur a problem that the operation or calculation may be made slightly complicated and the exposure control process may be made complicated accordingly since the gain value is set to a desired value. Therefore, if simplification of the operation or calculation and control process is preferentially considered, the gain value may be changed in a stepwise fashion. However, it is necessary to make a signal corresponding to the clip level higher than the original saturation level (that is, saturation level on the output side) according to the setting of the gain value. Further, an embodiment in which a value of the gain item is selected from values of 2 to the n-th power (n is a natural number) may be one of preferable embodiments.

Further, in the above embodiment, the gain-up amount is set after the clip level is set, but it is not always necessary to set the clip level and only the gain-up amount may be set. Specifically, in the dark output correction means, the gain-up amount can be set so that the saturation level of the correction signal obtained by eliminating the dark output component from the imaging signal of a pixel having the maximum dark output level will be made equal to or higher than the saturation level on the output side of the correction means. Also, in this case, the result which is equivalent to that obtained by clipping the imaging signal as described in the above embodiment can be attained and the effect of this invention can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging device which includes a plurality of pixels arranged two-dimensionally, and which outputs an imaging signal;
    dark output level detecting means for detecting, for each of the plurality of pixels, a dark output level superposed on the imaging signal;
    dark output correction means for correcting the imaging signal based on the detected dark output level, and for setting a clip level for a subject component of the imaging signal, based on the detected dark output level; and
    test imaging means for capturing a test image by performing a charge storage and readout operation of said imaging device for a test imaging time while shielding said imaging device from exposure;
    wherein the dark output level detection means detects the dark output level by deriving a dark output level of an actual imaging based on said test imaging time, an imaging device output level obtained by said test imaging means, and a charge storage time for exposure control of the actual imaging; and
    wherein the test imaging time and the charge storage time of the actual imaging are different from each other, and the dark output level of the actual imaging is derived by multiplying the imaging device output level X obtained by said test imaging means by a ratio Y/Z of the test imaging time Y of said test imaging means to the charge storage time Z for exposure control at the actual imaging time.

2. The imaging apparatus according to claim 1, wherein the test imaging time is shorter than the charge storage time of the actual imaging.

3. An imaging apparatus comprising:

an imaging device which includes a plurality of pixels arranged two-dimensionally, and which outputs an imaging signal;

dark output level detecting means for detecting, for each of the plurality of pixels, a dark output level superposed on the imaging signal;

dark output correction means for correcting the imaging signal based on the detected dark output level, and for setting an effective gain for a subject component of the imaging signal, based on the detected dark output level; and test imaging means for capturing a test image by performing a charge storage and readout operation of said imaging device for a test imaging time while shielding said imaging device from exposure;

wherein the dark output level detection means detects the dark output level by deriving a dark output level of an actual imaging based on said test imaging time, an imaging device output level obtained by said test imaging means, and a charge storage time for exposure control of the actual imaging; and wherein the test imaging time and the charge storage time of the actual imaging are different from each other, and the dark output level of the actual imaging is derived by multiplying the imaging device output level X obtained by said test imaging means by a ratio Y/Z of the test imaging time Y of said test imaging means to the charge storage time Z for exposure control at the actual imaging time.

4. The imaging apparatus according to claim 3, wherein the test imaging time is shorter than the charge storage time of the actual imaging.

5. An imaging apparatus comprising:

an imaging device which includes a plurality of pixels arranged two-dimensionally, and which outputs an imaging signal;

dark output level detecting means for detecting, for each of the plurality of pixels, a dark output level superposed on the imaging signal;

dark output correction means for correcting the imaging signal based on the detected dark output level, and for setting an effective gain for a subject component of the imaging signal, based on the detected dark output level; and wherein a value of the effective gain set by said dark output correction means is determined based on a resultant value obtained by dividing (i) a value corresponding to a saturation level on an output side of said dark output correction means by (ii) a difference between a value corresponding to a saturation level on an input side of said dark output correction means and a maximum value of the dark output level detected by said dark output level detecting means.

6. The imaging apparatus according to claim 5, wherein the value of the effective gain set by said dark output correction means is not smaller than said resultant value.

7. The imaging apparatus according to claim 6, wherein the value of the effective gain set by said dark output correction means is controlled in a stepwise fashion.

8. The imaging apparatus according to claim 5, wherein the value of the effective gain set by said dark output correction means is equal to said resultant value.

9. An imaging apparatus comprising:

an imaging device which includes a plurality of pixels arranged two-dimensionally, and which outputs an imaging signal;

dark output level detecting means for detecting, for each of the plurality of pixels, a dark output level superposed on the imaging signal;

dark output correction means for correcting the imaging signal based on the detected dark output level, and for setting a clip level and an effective gain for the corrected imaging signal, based on the detected dark output level; and test imaging means for capturing a test image by performing a charge storage and readout operation of said imaging device for a test imaging time while shielding said imaging device from exposure;

wherein the dark output level detection means detects the dark output level by deriving a dark output level of an actual imaging based on said test imaging time, an imaging device output level obtained by said test imaging means, and a charge storage time for exposure control of the actual imaging; and wherein the test imaging time and the charge storage time of the actual imaging are different from each other, and the dark output level of the actual imaging is derived by multiplying the imaging device output level X obtained by said test imaging means by a ratio Y/Z of the test imaging time Y of said test imaging means to the charge storage time Z for exposure control at the actual imaging time.

10. The imaging apparatus according to claim 9, wherein the test imaging time is shorter than the charge storage time of the actual imaging.

11. An imaging apparatus comprising:

an imaging device which includes a plurality of pixels arranged two-dimensionally, and which outputs an imaging signal;

dark output level detecting means for detecting, for each of the plurality of pixels, a dark output level superposed on the imaging signal; and dark output correction means for correcting the imaging signal based on the detected dark output level, and for setting a clip level and a effective gain for the corrected imaging signal, based on the detected dark output level;

wherein a value of the effective gain set by said dark output correction means is determined based on a resultant value obtained by dividing (i) a value corresponding to a saturation level on an output side of said dark output correction means by (ii) a difference between a value corresponding to a saturation level on an input side of said dark output correction means and a maximum value of the dark output level detected by said dark output level detecting means.

12. The imaging apparatus according to claim 11, wherein the value of the effective gain set by said dark output correction means is not smaller than said resultant value.

13. The imaging apparatus according to claim 12, wherein the value of the effective gain set by said dark output correction means is controlled in a stepwise fashion.

14. The imaging apparatus according to claim 11, wherein the value of the effective gain set by said dark output correction means is equal to said resultant value.

15. An imaging apparatus comprising:

an imaging device which includes a plurality of pixels arranged two-dimensionally, and which outputs and imaging signal;

dark output level detecting means for detecting, for each of the plurality of pixels, a dark output level superposed on the imaging signal;

dark output correction means for correcting the imaging signal by eliminating a dark output component from the imaging signal for said each pixel based on the detected dark output level, for setting a clip level for the corrected imaging signal based on a maximum value of the detected dark output level, and for setting an effective gain for the corrected imaging signal based on the set clip level; and exposure correction means for correcting exposure of said imaging device based on the gain.

16. An imaging method comprising:

imaging a subject with an imaging device which includes a plurality of pixels arranged two-dimensionally, and which outputs an imagine signal;

detecting for each of the plurality of pixels, a dark output level superposed on the imaging signal;

correcting the imaging signal based on the detected dark output level;

setting a clip level for the corrected imaging signal based on the detected dark output level;

setting an effective gain for the corrected imaging signal based on the set clip level; and controlling exposure of the imaging device according to the set gain.

* * * * *